США Patent [19]

Oliver, Jr. et al.

[11] Patent Number: 4,515,699
[45] Date of Patent: * May 7, 1985

[54] CHEMICALLY CLEANING DRILLING/COMPLETION/PACKER BRINES

[76] Inventors: John E. Oliver, Jr., 3752 Del Monte, Houston, Tex. 77019; Arnold M. Singer, 3042 Las Palmas, Houston, Tex. 77027

[*] Notice: The portion of the term of this patent subsequent to Jun. 26, 2001 has been disclaimed.

[21] Appl. No.: 450,519

[22] Filed: Dec. 17, 1982

Related U.S. Application Data

[63] Continuation-in-part of Ser. No. 310,653, Oct. 13, 1981, Pat. No. 4,456,537.

[51] Int. Cl.$^3$ .................... E21B 43/00; C09K 7/02
[52] U.S. Cl. ............................ 252/8.55 R; 210/727; 210/728; 252/8.5 B
[58] Field of Search ............ 252/8.5 R, 8.5 A, 8.5 B, 252/8.5 C, 8.55 R; 210/725, 727, 728, 729

[56] References Cited

U.S. PATENT DOCUMENTS

| | | | |
|---|---|---|---|
| Re. 23,614 | 1/1953 | Denman | 210/749 |
| 2,315,734 | 4/1943 | Ralston et al. | 252/326 |
| 2,343,430 | 3/1944 | Wells et al. | 210/749 |
| 3,025,236 | 3/1962 | Barrett et al. | 252/8.5 |
| 3,126,950 | 3/1964 | Carlberg et al. | 252/8.55 X |
| 3,524,908 | 8/1970 | Redmore et al. | 210/749 |
| 3,617,568 | 11/1971 | Ries | 210/727 |
| 3,737,037 | 6/1973 | Bone | |
| 3,787,319 | 1/1974 | Larsen | 252/8.5 |
| 3,798,270 | 3/1974 | Lee et al. | 260/566 |
| 3,882,029 | 5/1975 | Fischer et al. | 252/8.5 |
| 4,025,443 | 5/1977 | Jackson | 252/8.5 |
| 4,032,460 | 6/1977 | Zilch et al. | 252/8.55 |
| 4,140,639 | 2/1979 | Jackson | 252/8.5 |
| 4,172,801 | 10/1979 | Jackson | 252/8.5 |
| 4,233,162 | 11/1980 | Carney | 252/8.5 |
| 4,255,258 | 3/1981 | Carr et al. | 210/727 |
| 4,292,183 | 9/1981 | Sanders | 252/8.55 |
| 4,304,677 | 12/1981 | Stauffer et al. | 252/8.55 |

*Primary Examiner*—Herbert B. Guynn
*Attorney, Agent, or Firm*—Vaden, Eickenroht, Thompson & Jamison

[57] ABSTRACT

A process for removing contaminating solids from high density, salt type aqueous drilling/completion/packer fluid prior to its introduction into a well bore. A small effective (e.g., 0.5% volume) of an aliphatic alcohol, 2-ethyl hexanol, and a surface active chemical aid, the amide reaction product of a fatty monobasic acid (oleic) with a secondary amine diethanolamine are thoroughly intermixed into the fluid. After the solids agglomerate, the solids are separated from the fluid before introduction in a solids-free condition into the well bore. The fluid may have a density as high as 19 pounds per gallon and be a brine formed of the sodium, calcium or zinc salts with chloride or bromide anions.

6 Claims, No Drawings

CHEMICALLY CLEANING DRILLING/COMPLETION/PACKER BRINES

RELATED APPLICATION

This is a continuation-in-part of application Ser. No. 310,653 filed Oct. 13, 1981, now U.S. Pat. No. 4,456,537, and entitled "Chemically Cleaning Drilling/Completion/Packer Brines".

BACKGROUND OF THE INVENTION

1. Field of the Invention

This invention relates to the use of high density salt type aqueous fluids in wellbores, and it relates more particularly, to the introduction into the wellbore of these fluids in a solids-free condition.

2. Description of the Prior Art

Over the years, special aqueous brine solutions have been used in wellbores employed in the production of petroleum. These solutions have been used as both drilling, completion and packer fluids especially in deep wells subject to high formation gas pressures at elevated temperatures. The use of high density brines as well fluids in drilling, completion and packer functions is a well accepted practice in the oil field. These brines can be formed of the sodium, calcium and zinc salts with chloride and bromide. These aqueous fluids may include corrosion inhibitors and other salts such as soda ash. The density of these salt type well fluids depends in the particular salt, or mixture of salts, and their concentration in the aqueous well fluid. Usually, these salt type well fluids have a density in the range of between about 8 and 19 pounds per gallon.

The salt type well fluid should be solids-free in its use as a well fluid. If there are solids in a drilling or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solids deposits make it difficult to disconnect the tubing from the packer with a resultant costly well workover.

The high density salt type well fluids could be prepared at the wellsite by dissolving the prescribed amount of salt into the aqueous phase, which phase is principally water but can include various inhibitors for preventing pitting, corrosion, etc. The mixture is circulated or agitated until there were no undissolved solids. Naturally, the problems of adding salts to be dissolved in the aqueous well fluid became progressively more severe as the density increases, both in time, manpower and equipment requirements.

At present, several vendors will deliver to the wellsite the prepared high density salt type aqueous well fluids of a desired density and combination of selected ingredients. It is desired that these well fluids are clean and free of solids. However, the delivery of these well fluids usually requires several changes in containers. For example the well fluid is moved from the vendor tanks to truck transport, offshore supply boat and rig storage tanks. In most circumstances, the well fluid becomes contaminated by undesired solids, including residual water wetted solids and/or oil based drilling mud, weighting agents such as barite, rust, salt, silt and sand, and other undissolved materials. Contaminating liquids such as mud bases, lubricants and diesel fuel can also be present in the well fluid. Usually, these contaminating liquids are occluded or absorbed on the undissolved solids.

If the amount of solids in the well fluid were small in amount, the rig equipment may be used for their removal usually in a stepwise flow pattern through cartridge filters. However, the costs of manpower and rig time in filtering the well fluid is usually prohibitive (e.g., $100,000 per each work shift) unless the solids are (1) less than 0.01% by weight of the well fluid, (2) granular, and (3) not gelatinous as is usually the case with bentonite mud contamination.

Contamination of well fluid by drilling mud components is most common since the well fluid is usually handled at the rigs in parts of the mud system. The mud system usually suffers contamination during washing of the cased well bore to remove residual mud and cement solids immediately prior to the introduction of the high density salt-type completion/packer well fluids. Only a small amount of the wash liquid needs to be combined with the well fluid so that its solids content becomes excessive. Then, the well fluid must be treated to remove these solids. Any residual solids must be less than 5 microns in maximum dimension otherwise they cause formation plugging.

As mentioned, the use of cartridge filters is impractical on other than very low solid contents in the well fluid. Further, rig time in equipment and manpower is restricted and available only for critical operations, namely optimum drilling of the well bore. As a result, well fluid with large solids contamination must be either discarded or returned to some facility for purification. Since the well fluid is very expensive (e.g., $300–$900 per barrel) it cannot be discarded. Furthermore, the well fluid must be carefully handled so as not to be spilled or wasted because environment injury occurs from strong aqueous brines.

The present invention is a process for removing solids substantially completely from salt type aqueous well fluids using a minimum of chemicals and simple procedural steps; and, the solids removal is accomplished in only one or two hours using rig equipment and manpower.

SUMMARY OF THE INVENTION

In accordance with this invention, there is provided an improved process to produce solids-free aqueous fluids, such as well fluid of the high density salt type. Small effective amounts of 2-ethyl hexanol and a surface active chemical aid are introduced into the fluid. Then, the agglomerated solids are separated from the well fluid before its introduction into the wellbore in a solids free state. The surface active chemical aid has a molecular weight in the range of about 150 to about 500 with predominant hydrophobic characteristics. The surfactant is selected from the group consisting of aliphatic amines, amides and aliphatic amine oxides with the amine and amide and mine oxide constituents having an alkyl group with between 8 and 18 carbon atoms. The surfactant preferably is the amide reaction product of a fatty monobasic acid with a secondary amine.

In the preferred embodiment, the alcohol and the surface active chemical aid are each used in the amount of 0.5% by volume of the well fluid.

DESCRIPTION OF PREFERRED EMBODIMENT

The present process can be practiced in the equipment usually found on drilling rigs, especially the large variety used in offshore production of petroleum. The equipment needs are relatively simple, and include (1) a mixing vessel of adequate size (e.g., 500 barrel), (2) a mixing unit either an impellar type or a centrifugal recirculating loop, and (3) a mechanism (e.g., skimmer or decanter) to separate the agglomerated solids from the clear well fluid. In addition, the now clear well fluid is usually passed through a cartridge filter system as insurance of introducing only solids-free salt type aqueous well fluid into the wellbore. It will be apparent that the best practice of this process is at the wellbore with the solids-free well fluid after cleaning being immediately introduced into the wellbore.

The solids contaminated well fluid is placed into a suitable container which can be exposed to air or sealed as is desired. A mixer is provided the container so that the materials used in the present process can be thoroughly mixed with the well fluid. In addition, the container is provided with a suitable mechanism to remove the agglomerated solids from the liquid phase. For example, the mechanism can be a rotary sweeper to remove the solids over an inclined discharge ramp such as used in air flotation cells. Alternatively, the container can be provided with adjustable liquid draw off pipes so that the solids-free well fluid can be decanted away from the removed solids. If desired, the container can be provided with both the sweeper or decanter mechanism for separating the solids and the liquid phases. Usually, the container can be operated at the ambient temperatures at which the well fluid is secured.

The well fluid is assumed to be heavily loaded with solids which may be sand, formation particles and debris, oil, pipe dope, rust insoluble carbonates, mud solids such as barite, emulsifier, thinners, cement and other solid materials in various combinations and amounts that can be found in the well circulation system.

As the first step of this process, it is preferred to admix with the well fluid of a small effective amount the aliphatic alcohol. The amount of the alcohol is usually not required above about 2% volume. Usually, good results are obtained using alcohol amounts above about 0.5% by volume. In most well fluids, the alcohol can be used in the amount of 0.5% by volume and larger amounts, such as 1.0% by volume, do not seem to appreciably increase the described solid removal results. Usually, the solids removal results decrease when the amount of the alcohol is decreased simultaneously below the 0.5% by volume level.

After the alcohol is thoroughly distributed in the well fluid, the next step of this process is to admix the surface active chemical aid. The amount of the chemical aid is usually not required above about 2% by volume. Good results are obtained by using chemical aid amounts above about 0.5% by volume. In most well fluids, the chemical aid can be used in the amount of 0.5% by volume and larger amounts, such as 1.0% by volume, do not seem to appreciably increase the desired solid removal results. Usually, the solids removal results decrease when the amount of the chemical aid is decreased substantially below the 0.5% by volume level. Large amounts (e.g., above 3% by volume) of the chemical aid increases the amount of well fluid trapped in the removed solids. The chemical aid, and particularly the surfactant, appears to change the surface tension of the boundary film surrounding the negatively charged solid particles, and especially the bentonite constituents from drilling muds. This effect provided by the chemical aid is primarily the agglomeration of the solids mass from the well fluid.

It has been found that the minimum effective amounts of the alcohol and surface active chemical aid depends upon their activity nature and the particular solids in the well fluid. Thus, this minimum effective amount is emperical and there does not seem to be a determinable relationship in these amounts between a particular alcohol and a certain surface active chemical aid from the groups hereinafter defined.

After the alcohol and chemical aid are distributed within the well fluid, it is allowed to rest in the quiscent state. The solids are removed from the liquid phase by agglomeration into a gel-like soft mass which may float at the surface or settle to the container bottom depending upon the density of the agglomerated mass of solids. These solids remain stable in this agglomerated mass for substantial periods of time (e.g., a week) but can be redispersed if the well fluid is subject to remixing operations. The mass of solids are moved from the liquid phase by the sweeper or decanting or both in some instances where part of the solid mass floats, and another part of the mass sinks to the container bottom.

Generally, if the alcohol is added first to the well fluid and then followed by the chemical aid, an immediate clearing of the liquid phase occurs upon termination of the mixing operations. Addition of the chemical aid before or with the alcohol, sometimes requires a long quiscent condition for clearing solids from the liquid phase. The solids clearing time is measured in seconds and usually is completed within several minutes.

In either event, once the liquid phase has cleared, and the agglomerated mass of solids removed from it, the resultant well fluid is substantially solids-free especially of particle sizes greater than 5 microns in maximum dimension.

The alcohol is 2-ethylhexanol which is also known as 2 ethyl hexyl alcohol and Octyl alcohol. The chemical abstract service name is 1-hexanol, 2-ethyl. This alcohol can be obtained from sources of specialty solvents, and its slow evaporation rate and solvency make it useful in the present process. It has low water solubility and low surface tension properties which are an advantage in readily separating from the brine being cleaned of solids.

A good source for the alcohol is the suppliers to the producers of plasticizers for vinyl resins. Obviously, the alcohol does not need to be of chemical purity but usually will be 99.0% by volume of pure alcohol with slight amounts of organic acids and aldehydes that do not interfere in this process.

The 2-ethyl hexanol can be obtained from Tenneco Chemicals Inc., and it has a relatively high COC flash point of 183° F., with a specific gravity of about 0.83 at 77° F.

The surface active chemical aid includes a surfactant, and usually includes a carrier solvent such as a small amount of an aromatic hydrocarbon, corrosion and pitting inhibitor, and other additives desired to be added to the aqueous well fluid. The surfactant should have a molecular weight in the range of about 150 to about 500 with predominant hydrophobic characteristics. The surfactant is selected from the group comprising aliphatic amines, amides and alphatic amide oxides wherein the amine and amide oxide have an alkyl group with between 8 and 18 carbon atoms.

In general, the surfactant can be selected from the group comprising aliphatic amines, amides and aliphatic amine oxides wherein the surface active amine and amide and amine oxides have an alkyl group with between 8 and 18 carbon atoms. Good results can be obtained with surfactants that have a molecular weight of the surface active amine in the range of from about 150 to about 500, and with predominate hydrophobic characteristics.

Preferably, the surfactant is the amide reaction product of a fatty monobasic acid and a secondary amine. More particularly, the fatty acid can be given the formula $C_NH_{2N+1}COOH$ wherein N is an integer between 12 and 18. The fatty acid can be selected from the group of oleic and dimerized oleic, linoleic, palmit oleic, palmitic, myristic, myrestoleic and stearic acids. The oleic acid amide products give good results.

The secondary amines are selected from normal aliphatic amines that react with the fatty monobasic acids to form fatty amides that are generally used as nonionic emulsifiers. Good results are obtained when these amines are selected from the group consisting of diethanol amines.

One surfactant giving excellant results with 2-ethyl hexanol is a product of Witco Inc., and available under the tradename Witcamide 1017 (surfactant). This product has a specific gravity of 1.0 (same as water) is amber with a PMCC flash point above 200° F., and it is a product not hazardous under current Department of Labor definitions.

The operation theory of the alcohol and surface active chemical aid in the present process could not be determined within certainty from information presently available. It is believed that the alcohol serves to destabilize the dispersed solids by disrupting their electrophretic charges, and then the surfactant acts to gather the solids, and assembled oily materials, into a loose solids system that can be removed by careful liquid/solids phase separation techniques which do not impose shear or mixing energy during solids removal. For example, the liquid phase may be decanted from the solids. Alternatively, the solids can be removed gently by a sweeper such as used in air flotation cells.

It is preferred that the alcohol be added first and throughly admixed into the aqueous well fluid before the addtion of the surface active chemical aid. However, with certain alcohol and surface active chemical aid combinations, these materials can be added together and good solids removed can be produced in this process. At this time, there is no known guideline to aid in selecting these materials for use together in the well fluid so as to produce the same level of good results as provided by the separate but successive addition of the alcohol and then the surface active chemical aid. Likewise, with certain ingredients, the surface active chemical aid can be admixed first with the well fluid, and then the alcohol is added with good solids removal by this process. At this time, there is no known guideline to aid in selecting which surface active chemical aid and alcohol will provide in this addition arrangement the desired good solids removal from well fluid. Unless the alcohol is first mixed into the well fluid and then followed by adding the surface active chemical aid, some experimentation will be required to determine which of these materials can be added together or in reverse order, and yet produce the desired good solids removal by the present process.

In general, the present process can be used to remove solids from all salt type of aqueous well fluids. Usually, the presence of corrosion inhibitors, antipitting compounds, etc. will not create any problems in solids removal. Some of the materials used in preparing drilling muds can interfere in the process, as by requiring increased amounts of alcohol, surface active chemical aid, or in extending separation of the solids from the liquid phase. These interfering materials can be removed before practicing the present process steps. For example, the well fluid may have an appreciable amount of polyelectrolytes or polymers such as cellulose based organic fluid loss agents (e.g., HEC). In these cases, the polymer can be removed by early treatment of the well fluid with a strong oxidant such as hydrogen peroxide before practicing the present process on the well fluid.

From the foregoing, it will be apparent that there has been herein described a process for removing solids from salt type aqueous well fluid which is especially effective. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. In a process to produce a solid-free aqueous well fluid of high density type having one or more of the sodium, calcium or zinc salts with chloride and bromide, and mixtures thereof, including the steps of:
    (a) introducing in small effective amounts an aliphatic alcohol with between 5 to 8 carbon atoms and a surface active chemical aid into the fluid; and
    (b) seaparating the agglomerated solids from the fluid before introduction into a well bore in a solids free state, wherein the surface active chemical aid includes a surfactant having a molecular weight in the range of from about 150 to about 500 with predominant hydrophobic characteristics and the surfactant is selected from a group consisting of aliphatic amines, amides and aliphatic amine oxides with the amine and amide and amine oxide constituents having an alkyl group with between 8 and 18 carbon atoms, the improvement comprising in step
    (a) employing as the alcohol 2-ethyl hexanol.

2. The process of claim 1 wherein the surfactant is the amide reaction product of diethanolamine with an organic fatty monobasic acid of the general formula $C_NH_{2N+1}COOH$ wherein N is an integer between 12 and 18.

3. The process of claim 2 wherein the alcohol and surfactant are used in a 50/50 mixture by volume.

4. In a process to produce a solids-free aqueous brine fluid contaminated with solids selected from the group consisting of rust, sand and drilling mud, including the steps of:
    (a) introducing in small effective amounts an aliphatic alcohol with between 5 and 8 carbon atoms and a surface active chemical aid into the fluid; and
    (b) separating the agglomerated solids from the fluid before it is utilized in a solids free state, wherein the surface active chemical aid includes a surfactant having a molecular weight in the range of from about 150 to about 500 with predominant hydrophobic characteristics and the surfactant is selected from a group consisting of aliphatic amines, amides and aliphatic amine oxides with the amine and amide and amine oxide constituents having an alkyl group with between 8 and 18 carbon atoms, the improvement comprising in step (a) employing as the alcohol 2-ethyl hexanol.

5. The process of claim 4 wherein the surfactant is the amide reaction product of diethanolamine with an organic fatty monobasic acid of the general formula $C_NH_{2N+1}COOH$ wherein N is an integer between 12 and 18.

6. The process of claim 5 wherein the alcohol and surfactant are used in a 50/50 mixture by volume.

* * * * *